United States Patent
Kumar Balasubramanya (10) Patent No.: US 10,164,925 B2
(45) Date of Patent: Dec. 25, 2018

(54) SELECTION OF A DIGITAL CONTENT PAYOFF BASED ON IDENTIFIED MOBILE DEVICE TYPE

(71) Applicant: Hewlett-Packard Development Company, L.P., Houston, TX (US)

(72) Inventor: Anil Datta Kumar Balasubramanya, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 82 days.

(21) Appl. No.: 15/519,628

(22) PCT Filed: Oct. 23, 2015

(86) PCT No.: PCT/US2015/057043
§ 371 (c)(1),
(2) Date: Apr. 17, 2017

(87) PCT Pub. No.: WO2016/140709
PCT Pub. Date: Sep. 9, 2016

(65) Prior Publication Data
US 2017/0257335 A1    Sep. 7, 2017

(30) Foreign Application Priority Data
Mar. 5, 2015  (IN) .......................... 1080/CHE/2015

(51) Int. Cl.
*G06F 15/16* (2006.01)
*H04L 12/58* (2006.01)
(Continued)

(52) U.S. Cl.
CPC ............ *H04L 51/14* (2013.01); *G06F 3/1204* (2013.01); *G06F 3/1225* (2013.01);
(Continued)

(58) Field of Classification Search
CPC ......... H04L 51/14; H04L 51/08; H04L 51/38; G06F 3/1204; G06F 3/1225; G06F 3/1292
See application file for complete search history.

(56) References Cited

U.S. PATENT DOCUMENTS 6,587,972 B1    7/2003  Baird et al.
2010/0103447 A1  4/2010  Gurr, Jr. et al.
(Continued)

FOREIGN PATENT DOCUMENTS

EP      2617161 A1       7/2013
WO   WO-2012154347     11/2012
(Continued)

OTHER PUBLICATIONS

"OfficeJet 8600 Claim code for HP Connect," Apr. 3, 2014, HP Support Forums, <http://h30434.www3.hp.com/—5 pages.
(Continued)

*Primary Examiner* — Jonathan A Bui
(74) *Attorney, Agent, or Firm* — HP Inc. Patent Department (57) ABSTRACT

Examples disclosed herein relate to selection of a digital content payoff based on identified mobile device type. Examples include acquisition of a type of mobile device associated with a user, and selection of a digital content payoff based on the identified mobile device type. Examples further include generation of a customized test page including a machine-readable link associated with the selected digital content payoff, and causation of a printing device to print the customized test page.

15 Claims, 4 Drawing Sheets

(51) Int. Cl.
  *G06F 3/12* (2006.01)
  *G06F 3/0482* (2013.01)
  *G06Q 30/02* (2012.01)
  *H04L 29/12* (2006.01)
  *H04L 29/08* (2006.01)
  *H04M 3/42* (2006.01)
  *H04W 8/26* (2009.01)

(52) U.S. Cl.
  CPC ............ *G06F 3/1292* (2013.01); *H04L 51/08* (2013.01); *H04L 51/38* (2013.01); *G06F 3/0482* (2013.01); *G06F 3/121* (2013.01); *G06Q 30/0204* (2013.01); *H04L 61/3015* (2013.01); *H04L 67/306* (2013.01); *H04M 3/42* (2013.01); *H04W 8/26* (2013.01)

(56) References Cited

U.S. PATENT DOCUMENTS

| | | | |
|---|---|---|---|
| 2011/0085196 A1* | 4/2011 | Liu | G06F 3/1204 358/1.15 |
| 2012/0008161 A1 | 1/2012 | Rouhana | |
| 2012/0072595 A1 | 3/2012 | St Laurent et al. | |
| 2012/0075664 A1* | 3/2012 | Nichols | G06F 3/1204 358/1.15 |
| 2012/0287460 A1* | 11/2012 | McMillin | H04N 1/00204 358/1.15 |
| 2014/0185089 A1 | 7/2014 | Nuggehalli et al. | |
| 2014/0240735 A1* | 8/2014 | Salgado | G06F 3/1204 358/1.13 |
| 2015/0226330 A1 | 1/2015 | Yoshino et al. | |
| 2017/0177286 A1* | 6/2017 | Prabhu | G06F 3/1204 |

FOREIGN PATENT DOCUMENTS

| | | |
|---|---|---|
| WO | WO-2013/028560 A1 | 2/2013 |
| WO | WO-2014012449 | 1/2014 |
| WO | WO-2014120168 A1 | 8/2014 |

OTHER PUBLICATIONS

Computer Hope, "Setting up or installing a computer printer," Mar. 2, 2015, <http:www.computerhope.com/—3 pages.
Diablotins.org, "HPLIP Printer Test Page," Mar. 2. 2015, <http://diablotins.org/images/6/6e/Hp-test.png>, 1 page.
Diablotins.org, "Print, HPLIP," Mar. 2, 2015, (machine translation), <http:diablotins.org/index.php?title=imprimer._HPLIP>. 10 pages.
Electronics for Imaging, Inc., "PrintMe Mobile Administrator's Guide," Version 2.3, (Web Page), Aug. 27, 2012, http://w3.efi.com/printme-mobile/—25 pages.
ePC_News, "On the go with Weekend Go Guides," Nov. 5, 2012, https://h30495.www3.hp.com/—3 pages
Hewlett-Packard Development Company, L.P., "HP Connected—Getting the Printer Claim Code," Sep. 7, 2013, HP Customer Support, <http://support.hp.com/—7 pages.
Hewlett-Packard Development Company, L.P., "HP LaserJet—Driver support included in Windows 7 or in Windows Update," Mar. 2, 2015, http://h20564.www2.hp.com/ 10 pages.
Hewlett-Packard Development Company, L.P., "Print a Self-Test Page," retrieved Mar. 2, 2015, http://support.hp.com/—4 pages.
Hewlett-Packard Development Company, L.P., "Printing a Test Page," HP Support, Mar. 2, 2015, (Web page), <http://support.hp.com/—3 pages.
Hewlett-Packard Development Company, L.P., "Easily print from your smartphone or tablet," Mar. 2, 2015, HP Mobile Printing, 5 pages, http://www8.hp.com/.
Konica Minolta: Inc,, "Print From Mobile, Scan to Mobile, Instantly, Wirelessly.," Jan. 23, 2015, http://www.biz.konicaminolta.com/—7 pages.
PrinterOn Inc., "Printeron Mobile Print Application Overview and User Guide," (Web Page), Jan 23, 2015, version 3, http://www.printeron.com/documents/—21 pages.
Samsung Electronics Co., Ltd, "What is NFC Print?," Feb. 24, 2015, (Web Site), Samsung Smart Printers, 7 pages, <http://www.samsung.com/.
StackOverflow, "How to make QR code for BOTH Android Market and App Store," Dec. 9, 2014, 4 pages, <http://stackoverflow.com/.

\* cited by examiner

SELECTION OF A DIGITAL CONTENT PAYOFF BASED ON IDENTIFIED MOBILE DEVICE TYPE

BACKGROUND

A printing device, such as a printer, multifunction printer (MFP), or the like, may be utilized to print content on a physical medium such as paper. In some examples, the printing device may receive an electronic representation of the content from a computing device, such as a desktop or laptop computer, a mobile device, etc. In some examples, the computing device may include a print driver to render the content into a print-ready format that the printing device is able to print and to provide the rendered content to the printing device.

BRIEF DESCRIPTION OF THE DRAWINGS

The following detailed description references the drawings, wherein.

DETAILED DESCRIPTION

Printing device users frequently encounter difficulties when setting up a printing device for operation. Additionally, some users may not discover certain capabilities of a printing device, or ways in which a user may print to the printing device, such as using mobile printing technologies via a mobile device.

To address these issues, examples described herein may determine a type of mobile device associated with a user and cause a printing device to print a customized test page including a machine-readable link to content associated with printing on the printing device with the identified type of mobile device. For example, some examples described herein may, during a printing device installation process for a printing device, acquire identification of a type of a mobile device associated with a user and, based on the identified mobile device type, select, from among a plurality of digital content payoffs, a digital content payoff associated with printing on the printing device with the identified type of mobile device. Such examples may further generate a customized test page including a machine-readable link associated with the selected digital content payoff, the machine-readable link to cause the mobile device to access the selected digital content payoff in response to the mobile device capturing an image of the machine-readable link, and cause the printing device to print the customized test page.

In this manner, examples described herein may, during a printer installation process, determine a type of mobile device used by a user, and customize the test page (printed upon successful completion of the printing device installation) to include information informing the user of mobile printing option, and providing a machine-readable link (e.g., QUICK RESPONSE (QR) CODE, digital watermark, etc.) to information associated with mobile printing using the identified type of device (e.g., to a mobile printing application for the mobile device of the selected type). In this manner, examples described herein may inform users of mobile printing options at the time of the installation of the printing device, and may provide a machine-readable link appropriate to the user's device type to assist the user in setting up mobile printing from their mobile device.

Figure 1:
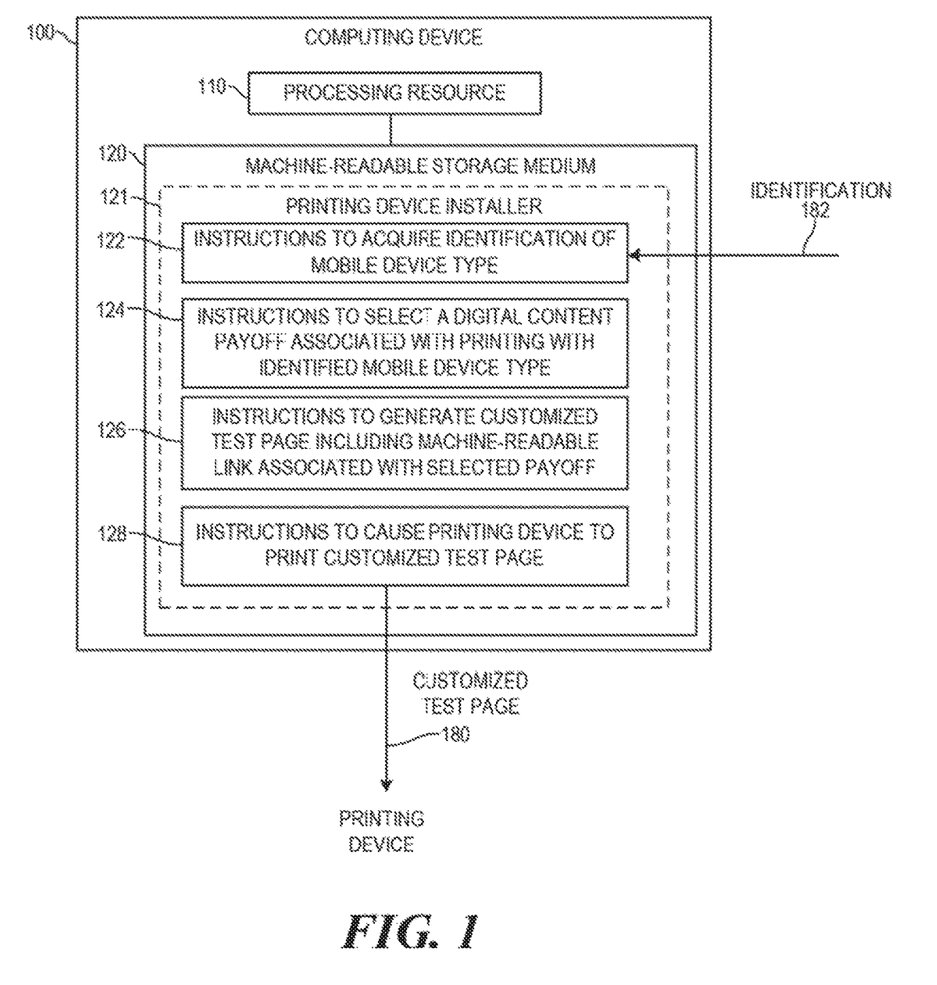
FIG. 1 is a block diagram of an example computing device to select a digital content payoff based on an identified mobile device type.

Referring now to the drawings, FIG. 1 is a block diagram of an example computing device 100 to select a digital content payoff based on an identified mobile device type. As used herein, a "computing device" may be a desktop computer, notebook computer, workstation, tablet computer, mobile phone, smart device, server, blade enclosure, printing device, or any other processing device or equipment.

In the example of FIG. 1, client computing device 100 includes a processing resource 110 and a machine-readable storage medium 120 encoded with (e.g., comprising) instructions 122, 124, 126, and 128, executable by processing resource 110 to perform the functions described below. In some examples, instructions 122, 124, 126, and 128 may be instructions of a printing device installer 121 stored on storage medium 120. In some examples, storage medium 120 may include additional instructions.

In examples described herein, a "printing device installer" may comprise a computer application including instructions executable by a processing resource of a computing device to perform a printing device installation process to at least prepare the computing device to print with the printing device. For example, a printing device installer may install a print driver for the printing device, the driver including instructions executable by the computing device to convert content to be printed into a print-ready format in which the printing device is able to print the content. In some examples, a printing device installer may create a print queue for the printing device on the computing device. In some examples, a printing device installer may perform other configuration of the computing device to prepare the computing device to print on the printing device.

In some examples, instructions 122, 124, 126, and 128, printing device installer 121, and any other instructions described herein in relation to storage medium 120, may be stored on a machine-readable storage medium remote from but accessible to computing device 100 and processing resource 110 (e.g., via a computer network). In examples described herein, a processing resource may include, for example, one processor or multiple processors included in a single computing device or distributed across multiple computing devices.

In the example of FIG. 1, instructions of installer 121 may perform a printing device installation process for a printing device. The printing device installation process may include any of the processes described above, such as installation of a print driver, creation of a print queue for the printing device, and the like. In some examples, during the printing device installation process for the printing device, instructions 122 may acquire identification 182 of a type of a mobile device associated with a user. In some examples, instructions 122 may display a graphical user interface (GUI) during the printing device installation process and receive an identification of a type of mobile device associated with a user. For example, during the printing device installation process, instructions 122 may, via the displayed GUI, prompt a user to identify a type of mobile device associated with the user (e.g., utilized by the user). In such examples, instructions 122 may display a list of selectable options including a plurality of different mobile device types. The list of selectable mobile device types may be presented in the GUI in any suitable manner, such as, for example, via a drop-down list, a plurality of radio buttons, or the like. The plurality of different mobile device types may include, for example, an ANDROID mobile device type (e.g., for mobile devices utilizing an ANDROID OS), an IOS ("iOS(™)") mobile device type (e.g., for mobile devices utilizing an IOS operating system), and the like. In some examples, the GUI may display too or more options of different mobile device types (e.g., OS types) for selection via the GUI.

In the example of FIG. 1, a user may select a mobile device type (e.g., corresponding to a type of mobile device that may be utilized by the user) by interacting with the displayed Gill using any suitable input device (e.g., mouse., keyboard, touch-sensitive display, or the like, or a combination thereof). In such examples, instructions 122 may acquire identification 182 of a type of mobile device utilized by a user by receiving an indication of the selection input by a user via the GUI using suitable input device(s).

Based on the identified mobile device type, instructions 124 may select, from among a plurality of digital content payoffs, a digital content payoff associated with printing on the printing device with the identified type of mobile device, in examples described herein, a "digital content payoff" may be any suitable type of information that may be accessed (e.g., retrieved, viewed, etc.) over a computer network, such as a website, webpage, at least one of textual, graphical, digital audio, and digital video content, a website or webpage providing such content, or the like. In examples described herein, a reference to such a digital content payoff may be in the form of, for example, a uniform resource identifier (URI), such as a uniform resource locator (URL) for an Internet location, or the like. In other examples, the reference may be in any other suitable form.

In the example of FIG. 1, each of the plurality of digital content payoffs may comprise content specific to a respective one of the mobile device types presented as options in the GUI by instructions 122, such as a website for downloading a mobile printing application specifically for the respective type of mobile device. For example, each of the digital content payoffs may be a remote network resource (e.g., website) providing access to a computer application executable with a respective type of mobile device and useable by the respective type of mobile device to print to the printing device.

In some examples, each digital content payoff may be a website on a digital distribution platform for computer applications. In such examples, each of the digital content payoffs may be a website to download a computer application for mobile printing on the printing device using a respective type of mobile device. For example, one of the digital content payoffs may be a website at which to download an iOS version of a mobile printing application for mobile printing with a first type mobile device (e.g., an IOS type mobile device). In such examples, the plurality of digital content payoffs may also include a website at which to download an ANDROID version of a mobile printing application for mobile printing with a second type of mobile device (e.g., an ANDROID type mobile device), a website at which to download a WINDOWS version of a mobile printing application for mobile printing with a third type of mobile device (e.g., a WINDOWS type mobile device), and the like for other types of mobile devices. In such examples, each of the mobile printing applications may be specific to one of the selectable types of mobile device in that each mobile printing application is capable of being run on one of the types of mobile device, but not on other types of mobile device.

In the example of FIG. 1, based on identification 182 of a type of a mobile device associated with a user acquired by instructions 122, instructions 124 may select a digital content payoff that is a remote network resource (e.g., a website) providing access to a computer application (e.g., a mobile printing application) executable with the identified type of mobile device and useable by the identified type of mobile device to print to the printing device (and not executable or useable by a different type of mobile device). For example, based on an identification 182 that an IOS type of a mobile device is associated with a user, instructions 124 may select a digital content payoff that is a URL to a website of an IOS application digital distribution platform, the website providing access to an IOS mobile printing application executable with and useable by the IOS-type of mobile device (and not by other types of mobile devices, such as ANDROID and WINDOWS types of mobile devices) to prim to the printing device.

In some examples, printing device installer 121 may include references (e.g., URLs) to a plurality of digital content payoffs. In such examples, the references (e.g., URLs) may be stored on storage medium 120 or in other memory of computing device 100. In such examples, instructions 124 may select a digital content payoff from among a plurality of different digital content payoffs by selecting a reference to one of the digital content payoffs from among the plurality of stored references (e.g., URLs) to the digital content payoffs. In such examples, each of the plurality of digital content payoffs may be associated with printing on the printing device with a different type of mobile device, as described above, for example.

In some examples, instructions 124 may generate a machine-readable link associated with the selected digital content payoff. In examples described herein, a "machine-readable link" (which may be referred to herein as an "optically machine-readable link") may be an image that is optically readable by a computing device using an image capture device (e.g., a digital camera, or the like) to obtain access to a digital content payoff associated with the image. A machine-readable link may comprise at least one of a barcode (e.g., a one-dimensional barcode, two-dimensional barcode, matrix barcode, QUICK RESPONSE CODE (QR CODE), or the like), a digital watermark, a target image such as a printed photograph (e.g., far use with augmented reality), or the like.

In some examples, a machine-readable link associated with a digital content payoff may be a machine-readable link, that encodes a reference (e.g., URL) to a website that is the digital content payoff, as described above. In such examples, a computing device, such as a mobile device including a digital camera may optically capture the machine-readable link, determine the encoded reference (e.g., URL) with a sink reading application, and navigate to the website (or other remote network resource) based on determining the encoded reference.

In such examples, based on the acquired identification 182 of a type of mobile device, instructions 124 may select the digital content payoff associated with the identified type of mobile device, as described above, by selecting a URL for the digital content payoff. In such examples, instructions 124 may generate a machine-readable link associated with the selected digital content payoff by, for example, generating a QR CODE (or other machine-readable link) encoding the selected URL.

In the example of FIG. 1, instructions 128 may generate a customized test page 180 including the machine-readable link associated with the selected digital content payoff, the machine-readable link to cause the mobile device to access the selected digital content payoff in response to the mobile device capturing an image of the machine-readable link. In examples described herein, a "test page" (which may be referred to herein as a "printing device installation test page") may be at least one page of content that may be printed by a printing device installer executing on a computing device at least to confirm that the printing device installer has successfully prepared the computing device to print with the printing device. Successfully preparing the computing device to print with the printing device may include successful completion of one or more functions of the printing device installation process described above, such as installation of a print driver, creation of a print queue for the printing device, other configuration, or the like, or a combination thereof.

In some examples, instructions 126 may generate the customized test page 180 by adding the machine-readable link associated with the selected digital content payoff to a test page template, as described further below and illustrated in FIG. 2. In the example of FIG. 1, instructions 128 may cause the printing device to print customized test page 180. In some examples, instructions 128 may cause the printing device to print the customized test page 180 via a print driver installed on computing device 100 by printing device installer 121 for the printing device. In such examples, the print driver may render the customized test page 180 into a print-ready format for the printing device. Computing device 100 may provide the rendered test page 180 to the printing device in any suitable manner (e.g., via wired or wireless communication, or the like, or a combination thereof).

As described above, in some examples, instructions 124 may select a digital content payoff from among a plurality of different digital content payoffs by selecting a reference (e.g., URL) to one of the digital content payoffs from among the plurality of stored references (e.g. URLs) to the digital content payoffs, and may generate the machine-readable link associated with the selected digital content payoff.

In other examples, instructions 124 may select a digital content payoff from among a plurality of different digital content payoffs by selecting, from among a plurality of different predetermined machine-readable links associated with different digital content payoffs, the machine-readable link associated with the digital content payoff associated with printing on the priming device with the identified type of mobile device. In such examples, the plurality of machine-readable links may be stored on storage medium 120 as part of printing device installer 121, or may be stored in other memory of computing device 100 by installer 121. In such examples, instructions 124 may select the digital content payoff by selecting the machine-readable link associated with the digital content payoff. In some examples, a machine-readable link associated with a given digital content payoff may be a machine-readable link that encodes a reference (e.g., URL) to the digital content payoff (e.g., website), such that a computing device that captures the machine-readable link with a digital camera may determine the reference from the captured image and navigate to the digital content payoff. Such machine-readable links encoding references may include, for example, QR CODES and digital watermarks.

In other examples, a machine-readable link associated with a given digital content payoff may be a machine-readable link that encodes data useable by a computing device to access the digital content payoff via a remote linking service. For example, a machine-readable link may encode data such that a computing device that captures the machine-readable link with a digital camera may determine the encoded data from the captured image and use the data to access a digital content payoff associated with the machine-readable link via a remote linking service (e.g., by providing the data to the linking service, and receiving a URL or other reference to the digital content payoff). Such machine-readable links encoding data to access digital content payoffs via a linking service may include, for example, digital watermarks and images used for augmented reality.

In other examples, instructions 124 may acquire a machine-readable link for customized test page 180 from a remote linking service. In such examples, instructions 124 may select, from among a plurality of different digital content payoffs each associated with printing on the printing device with a different type of mobile device, the digital content payoff associated with printing on the printing device with the identified type of mobile device, as described above. In some examples, instructions 124 may further acquire, from a remote lining service, a machine-readable link associated with the selected digital content payoff via the linking service, as described above. In such examples, instructions 124 may provide a reference to (e.g., a URL of) the selected digital content payoff to the remote inking service along with an image for the remote linking service to associate with the selected digital content payoff. A remote linking service using digital watermarking may return a digital watermarked version of the image encoding data useable to retrieve a reference to the digital content payoff from the linking service in response to capturing an image of the watermarked image with a digital camera of the computing device. In other examples (e.g., when utilizing augmented reality), the linking service may return a reference to the digital content payoff in response to an indication that a computing device has captured the image with its digital camera.

In examples described herein, a "remote linking service" may be a service implemented by one or more networked computing devices to create and manage machine-readable links, and to create and manage the assignment of content to respective machine-readable links. In some examples, a linking service may comprise a linking platform, which may be a system implemented by one or more networked computing devices to perform functions of the linking service, including associating digital content payoffs with respective machine-readable inks and providing a computing device access to the digital content payoffs assigned to a given machine-readable link in response to an indication that the computing device has captured an image of the given machine-readable link (e.g., providing data encoded in the image, providing the captured image, or the like).

In some examples, in addition to providing the mobile device type options in the GUI, instructions 122 may also display a generic option in the GUI, the selection of which does not identify any particular type of mobile device. In such examples, in response to receiving a selection of the generic option, selection engine 324 may to select a generic digital content payoff. The generic digital content payoff may be a remote network resource of information relating to printing on the printing device with each of multiple different types of mobile devices, such as a website indicating how to print with each of multiple different types of mobile devices.

In examples described herein, a "mobile device" may be a mobile phone, smart device (e.g., smartphone), tablet computer, laptop, or any other type of computing device including a portable energy source (e.g., battery, etc.) capable of powering the device when not connected to an external power source. In examples described herein, the "type" of mobile device is defined by the type of operating system (OS) utilized by the mobile device. In some example, the type of a mobile device may be defined by the type of OS utilized by the mobile device, regardless of OS version(s). For example, mobile devices running IOS operating systems may be considered the same type of mobile device, even when they run different versions of IOS. In some examples, a mobile device running an IOS operating system (regardless of version) may be considered to be a different type of mobile device than a mobile device running an ANDROID OS (regardless of version). In some examples, two mobile devices may be considered to be different types of mobile devices when one or more applications (or "apps") able to run on one of the mobile devices are not able to run on the other mobile device (e.g., due to incompatibility of the app(s) with the OS of the other mobile device). For example, apps able to run on a mobile device running IOS (i.e., a mobile device of a first type) may not be able to run on another mobile device running ANDROID (i.e., a mobile device of a second type different than the first type).

As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may include one processor or multiple processors. Processing resource 110 may fetch, decode, and execute instructions stored on storage medium 120 to perform the functionalities described above. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like For example, any machine-readable storage medium described herein may be any of Random Access Memory (RAM), volatile memory, non-volatile memory, flash memory, a storage drive (e.g., a hard drive), a sold state drive, any type of storage disc (e.g., a compact disc, a DVD, etc.), and the like, or a combination thereof. Further, any machine-readable storage medium described herein may be non-transitory. In examples described herein, a machine-readable storage medium or media is part of an article (or article of manufacture). An article or article of manufacture may refer to any manufactured single component or multiple components. The storage medium may be located either in the computing device executing the machine-readable instructions, or remote from but accessible to the computing device (e.g., via a computer network) for execution. Any memory described herein may be implemented by at least one machine-readable storage medium.

In examples described herein, a first computing device "remote" from a second computing device may be a first computing device that is separate from, and not directly connected to, the second computing device, wherein the first and second computing devices may access one another over a computer network. As used herein, a computer network may include, for example, local area network(s) (LAN(s)), wireless local area network(s) (WLAN(s)), virtual private network(s) (VPN(s)), the Internet, telephone network(s) (e.g., cellular telephone network(s)), or the like, or a combination thereof.

In some examples, printing device installer 121, including instructions 122, 124, 126, and 128 may be part of an application fiat may be executed by processing resource 110 to implement the functionalities described above in relation to those instructions. In such examples, storage medium 120 may be a portable medium, such as a CD, DVD, or flash drive, or a memory maintained by a server from which the application package can be downloaded and then executed on computing device 100, for example. In other examples, printing device installer 121, including instructions 122, 124, 128, and 128 may be part of an application, applications, or component already installed on client computing device 100. In such examples, the storage medium 120 may include memory such as a hard drive, solid state drive, or the like. In some examples, functionalities described herein in relation to FIG. 1 may be provided in combination with functionalities described herein in relation to any of FIGS. 2-5.

Figure 2:
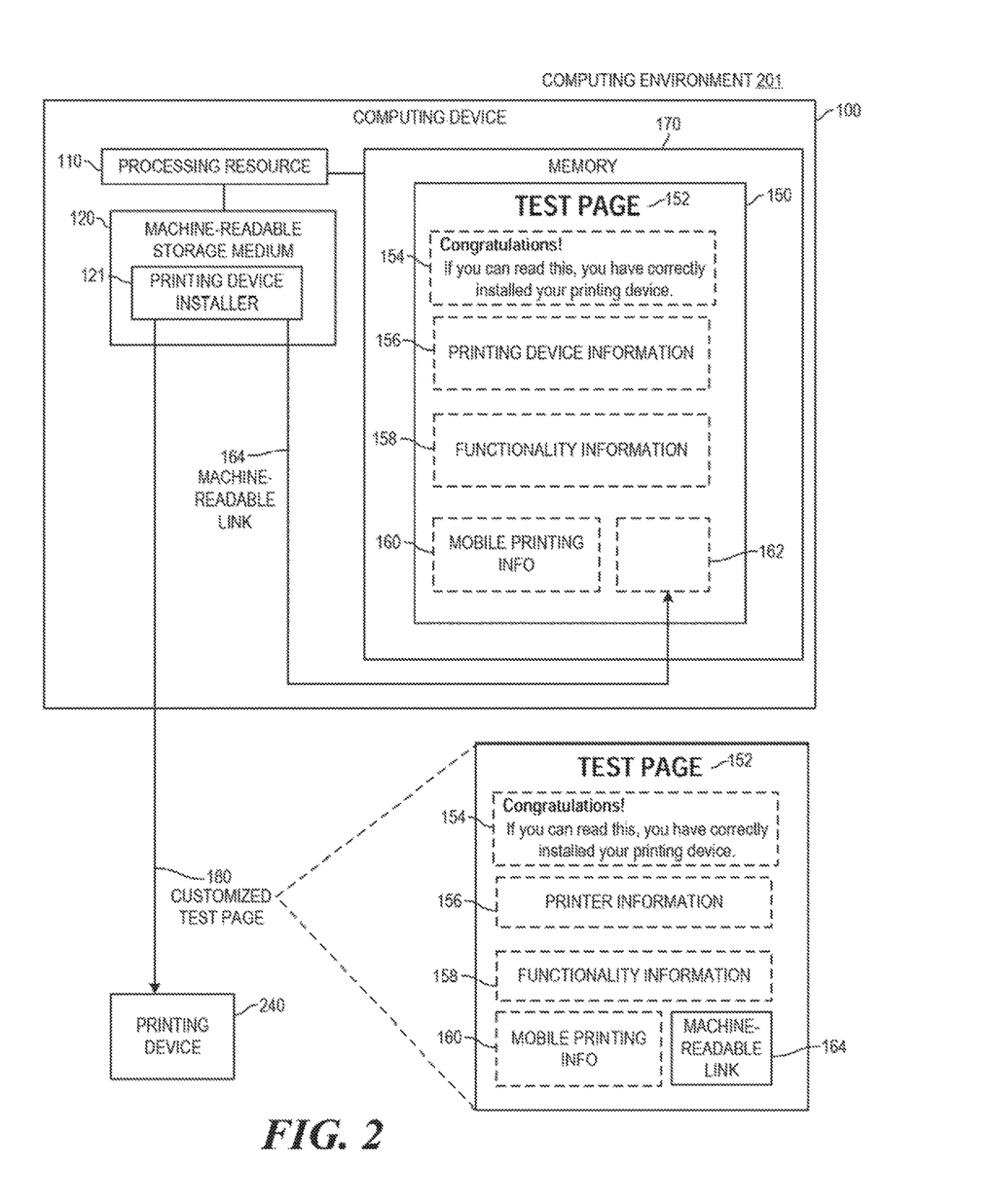
FIG. 2 is a block diagram of an example computing environment to generate a customized test page based on an identified mobile device type.

FIG. 2 is a block diagram of an example computing environment 201 to generate a customized test page based on an identified mobile device type. Computing environment 201 includes a computing device 100, as described above, and a printing device 240. As described herein, a "printing device" may be a device to print content on a physical medium (e.g., paper or a layer of powder-based build material, etc.) with a printing fluid (e.g., ink) or toner. In the case of printing on a layer of powder-based build material, the printing device may utilize the deposition of printing fluids in a layer-wise additive manufacturing process. A printing device may utilize suitable printing consumables, such as ink, toner, fluids or powders, or other raw materials for printing. In some examples, a printing device may be a three dimensional (3D) printing device.

In the example of FIG. 2, computing device 100 includes a processing resource 110 and a machine-readable storage medium 120 storing a printing device installer 121, as described above in relation to FIG. 1. Printing device installer 121 includes instructions 122, 124, 126, and 128, as described above in relation to FIG. 1. In the example of FIG. 2, computing device 100 may further include memory 170, which may be implemented by at least one machine-readable storage medium. In some examples, a test page template 105 may be stored in memory 170 separate from storage medium 120, as illustrated in FIG. 2. In other examples, test page template 150 may be stored on machine-readable storage medium 120.

In the example of FIG. 2, instructions 122 of installer 121 may, during a printing device installation process for a printing device, acquire identification of a type of a mobile device associated with a user, as described above. Instructions 124 of installer 121 may, based on the identified mobile device type, select, from among a plurality of digital content payoffs, a digital content payoff associated with printing on the printing device with the identified type of mobile device, as described above.

As described above, instructions 126 of installer 121 may generate a customized test page 180 including a machine-readable link 164 associated with the selected digital content payoff, the machine-readable link 164 to cause the mobile device to access the selected digital content payoff in response to the mobile device capturing an image of the machine-readable link, as described above. In the example of FIG. 2, to generate customized test page 180, instructions 126 may add, to test page template 150, the machine-readable link 164 associated with the selected digital content payoff.

In the example of FIG. 2, the test page template 150 may include a plurality of sections, which may include at least one of a title section 152 (e.g., "TEST PAGE"), a test result section 154, a printing device information section 156, a functionality information section 158, a mobile printing information section 160, and a link section 162, or a combination thereof. In the example of FIG. 2, test result section 154 may note that successful printing of the test page indicates that the printing device installer has successfully prepared computing device 100 to print with printing device 240. Printing device information section 156 may include information about printing device 240 (e.g., printing fluid level(s)), and may be customized for printing device 240 by installer 121 or other application(s) installed by installer 121 for printing device 240. Functionality information section 158 may provide information on printing functionalities that may be available for use with the printing device (e.g., secure pull printing, or the like). A mobile printing information section 160 may include at least one of information regarding mobile printing and information regarding how to set up mobile printing. Link section 162 may be a portion of the template 150 to receive the machine-readable link 164 associated with the digital content payoff selected by installer 121.

In the example of FIG. 2, instructions 124 may determine machine-readable link 164, associated with the selected digital content payoff, in any suitable manner as described above. In the example of FIG. 2, instructions 126 of installer 121 may add machine-readable link 164 to region 162 of test page template 150 in any suitable manner. For example, test page template 150 may be stored in an extensible markup language (XML) paper specification (XPS) format and instructions 126 may add an image of machine-readable link 164 to region 162 of template 150 in the XPS format to generate customized test page 180. In such examples, instructions 128 may cause printing device 240 to print customized test page 180 via a print driver (e.g., installed by installer 121) to convert the customized test page in the XPS format to a customized test page 180 in a print-ready format (e.g., PDF, etc ).

In other examples, test page template 150 may be stored on computing device 100 in a print-ready format for printing device 240 (e.g., PDF, etc.). In such examples, instructions 126 may add an image of machine-readable link 164 to region 162 of template 150 to generate customized test page 180 in the print-ready format. In such examples, instructions 128 may cause printing device 240 to print customized test page 180 without passing through a print driver, as the customized test page 180 is already in a print-ready format for printing device 240. In some examples, functionalities described herein in relation to FIG. 2 may be provided in combination with functionalities described herein in relation to any of FIGS. 1 and 3-5.

Figure 3:
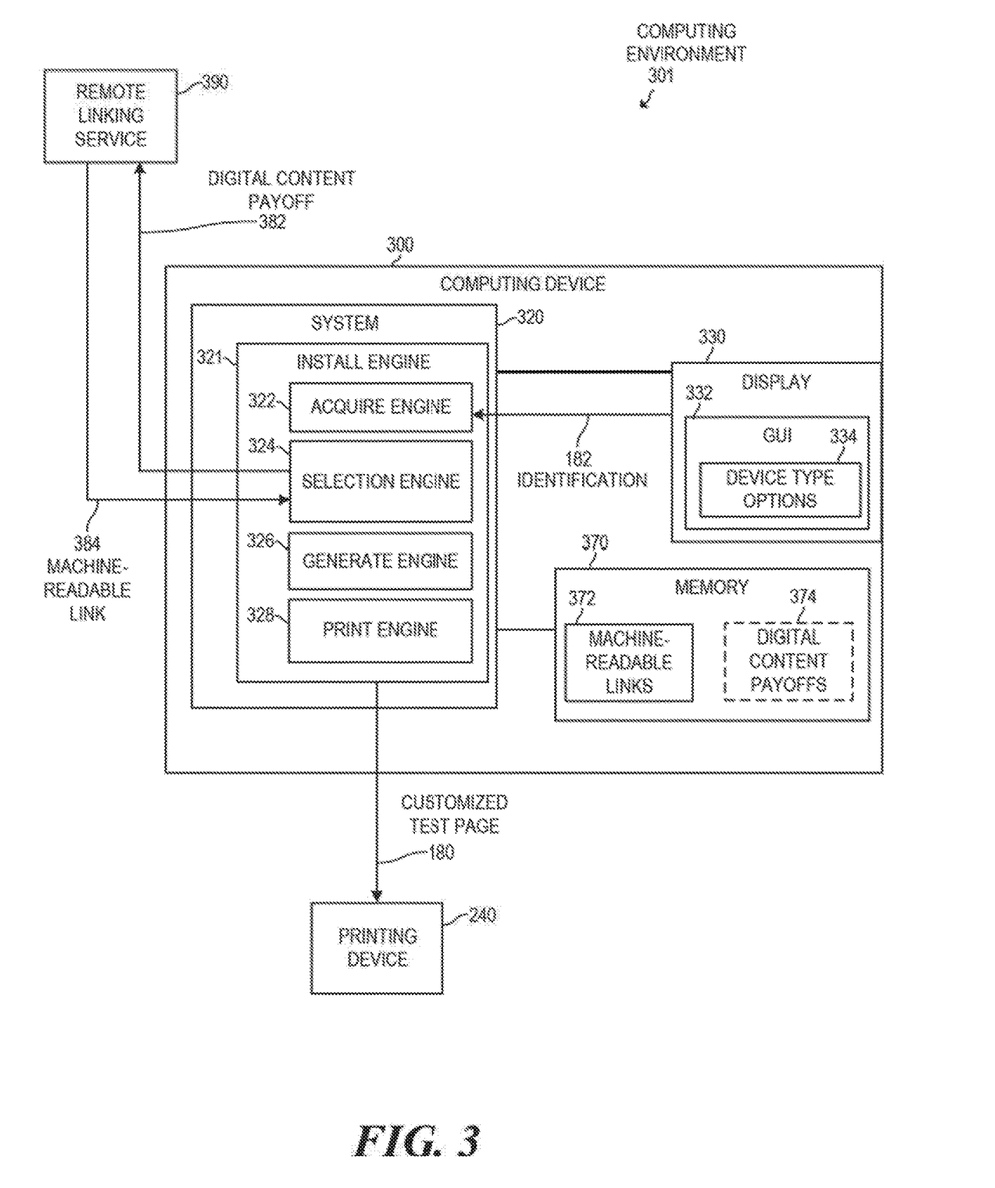
FIG. 3 is a block diagram of an example computing environment including a system to generate a customized test page including a machine-readable link associated with the selected digital content payoff.

FIG. 3 is a block diagram of an example computing environment 301 including a system 300 to generate a customized test page 180 including a machine-readable link associated with the selected digital content payoff. In the example of FIG. 3, computing environment 301 comprises a computing device 300 including a system 320 comprising engines 321, 322, 324, 326, and 328. Computing device 300 further includes a display 330 and memory 370. Computing environment 301 further includes a printing device 240 and a remote linking service 390.

In the example of FIG. 3, install engine 321 may perform a printing device installation process for printing device 240, as described above in relation to FIG. 1. During the installation process, acquire engine 322 may display, on display 330 of computing device 330, a GUI 332. In the GUI, engine 322 may display a plurality of mobile device type options 334, as described above in relation to FIG. 1.

During the printing device installation process for printing device 240, acquire engine 322 may acquire identification 182 of a type of a mobile device associated with a user. For example, engine 322 may receive identification 182 of a selected type of mobile device as input to GUI via at least one input device of computing device 300, as described above.

In response to identification of a first type of mobile device, engine 324 may select a first digital content payoff associated with printing on the target printing device with the first type of mobile device. In some examples, engine 324 may select the first digital content payoff from among a plurality of digital content payoffs 374 stored in memory 370 of computing device 300, as described above. In other examples, engine 324 may select the first digital content payoff by selecting a machine-readable link associated with the first digital content payoff from among a plurality of machine-readable links 372 stored in memory 370, as described above. In other examples, at least one of digital content payoffs 374 and machine-readable links 372 may be stored in system 320 as part of install engine 321, In some examples, we of digital content payoffs 374 and machine-readable links 372 may be omitted form computing device 300.

In some examples, the first digital content payoff is a remote network resource providing access to (e.g., a website from which to download) a first computer application executable with the first type of mobile device and useable by the first type of mobile device to print to the printing device, and wherein the first computer application is not useable by the second type of mobile device to print to the printing device. For example, the first type of mobile device may be an IOS device and the first computer application may be an application executable on an IOS mobile device, but not executable on an ANDROID device (e.g., a second type of mobile device).

In response to identification of a second type of mobile device (different than the first type), engine 324 may select a second digital content payoff (different than the first digital content payoff) associated with printing on the target printing device with the second type of mobile device, in any manner as described above. In some examples, the second digital content payoff is a remote network resource providing access to (e.g., a website from which to download) a second computer application executable with the second type of mobile device and useable by the second type of mobile device to print to the printing device, and wherein the second computer application is not useable by the first type of mobile device to print to the printing device. For example, the second type of mobile device may be an ANDROID device and the second computer application may be an application executable on an ANDROID mobile device, but not executable on an IOS device (e.g., a first type of mobile device).

In the example of FIG. 3, engine 326 may generate a customized printer installer test page 180 including a machine-readable link associated with the selected digital content payoff, the machine-readable link to cause the mobile device to access the selected digital content payoff in response to the mobile device capturing an image of the machine-readable link. Selection engine 324 may obtain the machine-readable link associated with the selected digital content payoff in any suitable manner as described above. In some examples, engine 326 may generate the customized test page by adding the machine-readable link associated with the selected digital content payoff to a test page template, as described above. Print engine 328 may cause printing device 240 to print customized printer installer test page 180, in any suitable manner as described above.

In some examples, selection engine 324 may select a digital content payoff 382 associated with the identified type of mobile device from among payoffs 374. In some examples, as described above, engine 324 may provide the payoff 382, or a reference to (e.g., URL of) payoff 382 to a remote linking service 390 of computing environment 301, along with an image (e.g., a logo, or any other suitable image) to use for the machine-readable link 384. In such examples, the remote linking service 390 may associate machine-readable link 384 with digital content payoff 382, as described above, such that the linking service provides a computing device access to the digital content payoff in response to an indication that the computing device has captured an image of the machine-readable link, in such examples, engine 324 may acquire the machine-readable link 384 associated with the selected digital content payoff 382 from the remote linking service 390.

In some examples, in addition to the mobile device type options 334, engine 322 may also display a generic option in GUI 332, the selection of which does not identify any particular type of mobile device. In such examples, in response to receiving a selection of the generic option, selection engine 324 may to select a generic digital content payoff. The generic digital content payoff may be a remote network resource of information relating to printing on the printing device with each of multiple different types of mobile devices, such as a website indicating how to print with each of multiple different types of mobile devices.

Each of engines 321, 322, 324, 326, and 328 of system 320 may be any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 321 322, 324, 326, and 328. In such examples, system 320 may include the machine-readable storage medium storing the instructions and the processing resource to execute the instructions, or the machine-readable storage medium may be separate but accessible to system 320 and the processing resource.

In some examples, the instructions can be part of an application that may be executed by the processing resource to implement at feast engines 321, 322, 324, 326, and 328.

In such examples, the machine-readable storage medium may be a portable medium, such as a CD, DVD, or flash drive, or a memory maintained by a server from which the application can be downloaded and then executed on computing device 300, for example. In other examples, the instructions may be part of an application on computing device 300. In such examples, the machine-readable storage medium may include memory such as a hard drive, solid state drive, or the like. In other examples, the functionalities of any engines of system 320 may be implemented in the form of electronic circuitry. In some examples, functionalities described herein in relation to FIG. 3 may be provided in combination with functionalities described herein in relation to any of FIGS. 1-2 and 4-5.

Figure 4:
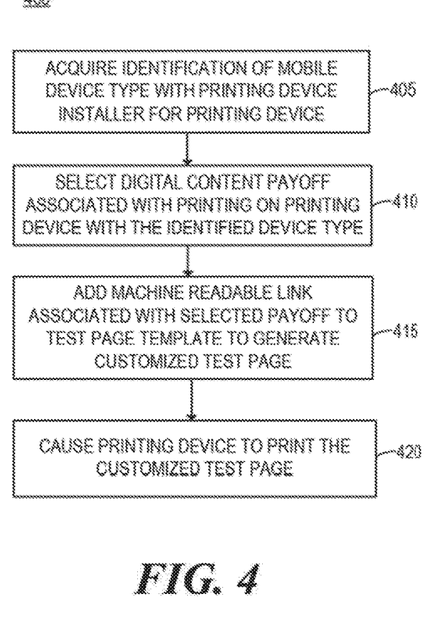
FIG. 4 is a flowchart of an example method for selecting a digital content payoff associated with printing with an identified type of mobile device.

FIG. 4 is a flowchart of an example method 400 for selecting a digital content payoff associated with printing with an identified type of mobile device. Although execution of method 400 is described below with reference to client computing device 100 of FIGS. 1 and 2 described above, other suitable computing devices for the execution of method 400 can be utilized (e.g., computing device 300). Additionally, implementation of method 400 is not limited to such examples.

At 405 of method 400, a printing device installer 121 (for a printing device) executing on computing device 100 may acquire identification 182 of a type of a mobile device associated with a user. In such examples, instructions 122 of installer 121 may acquire the identification 182 of the type of mobile device. At 410, based on the identified mobile device type, instructions 124 may select, from among a plurality of digital content payoffs associated with respective types of mobile devices, a digital content payoff associated with printing on the printing device with the identified type of mobile device, as described above.

At 415, instructions 126 printing device installer 121 may add, to a test page template, a machine-readable ink associated with the selected digital content payoff to generate a customized test page, the machine-readable link to cause the mobile device to access the selected digital content payoff in response to the mobile device capturing an image of the machine-readable link, as described above. In some examples, instructions 126 may add the machine-readable link to the test page template to generate the customized test page. At 420, instructions 128 may cause the printing device to print the customized test page.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided In combination with functionalities described herein in relation to any of FIGS. 1-3 and 5.

Figure 5:
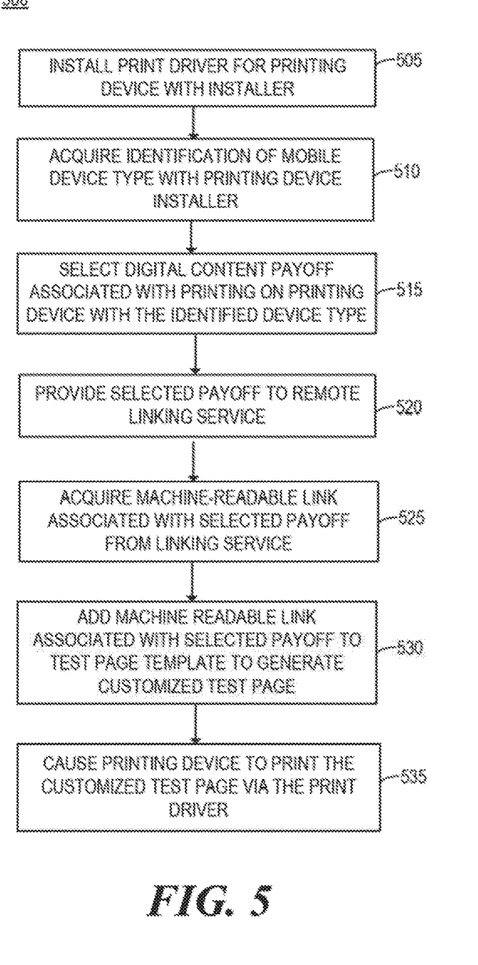
FIG. 5 is a flowchart of an example method for causing a printing device to print a customized test page.

FIG. 5 is a flowchart of an example method 500 for causing a printing device to print a customized test page. Although execution of method 500 is described below with reference to client computing device 100 of FIGS. 1 and 2 described above, other suitable computing devices for the execution of method 500 can be utilized (e.g., computing device 300). Additionally, implementation of method 500 is not limited to such examples.

At 505 of method 500, printing device installer 121 for a printing device may install a print driver for the printing device on computing device 100. At 510, instructions 122 of printing device installer 121 executing on computing device 100 may acquire identification 182 of a type of a mobile device associated with a user. At 515, based on the identified mobile device type, instructions 124 may select, from among a plurality of digital content payoffs associated with respective types of mobile devices, a digital content payoff associated with printing on the printing device with the identified type of mobile device, as described above.

At 520, instructions 124 may provide the selected digital content payoff to a remote linking service (see, e.g., service 390 of FIG. 3), as described above. At 525, instructions 124 may acquire a machine-readable link associated with the selected digital content payoff from the remote linking service, as described above.

At 530, instructions 126 of printing device installer 121 may add, to a test page template, the machine-readable link acquired from the remote linking service and associated with the selected digital content payoff to generate a customized test page. In such examples, the machine-readable link is to cause the mobile device to access the selected digital content payoff in response to the mobile device capturing an image of the machine-readable link, as described above. At 536, instructions 128 may cause the printing device to print the customized test page via the installed print driver.

Although the flowchart of FIG. 5 snows a specific order of performance of certain functionalities, method 500 is not limited to that order. For example, the functionalities shown in succession in the flowchart may be performed in a different order, may be executed concurrently or with partial concurrence, or a combination thereof. In some examples, functionalities described herein in relation to FIG. 5 may be provided in combination with functionalities described herein in relation to any of FIGS. 1-4.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A non-transitory machine-readable storage medium comprising instructions of a printing device installer executed by a processor of a computing device to:
   during a printing device installation process for a printing device, acquire identification of a type of a mobile device associated with a user;
   based on the identified mobile device type, select, from among a plurality of digital content payoffs, a digital content payoff associated with printing on the printing device with the identified type of mobile device;
   generate a customized test page including a machine-readable link associated with the selected digital content payoff, the machine-readable link causing the mobile device to access the selected digital content payoff in response to the mobile device capturing an image of the machine-readable link; and
   cause the printing device to print the customized test page.

2. The storage medium of claim 1, wherein the instructions to acquire comprise instructions to:
   receive the identification of the type of the mobile device as input to a graphical user interface (GUI) displayed during the printing device installation process.

3. The storage medium of claim 1, wherein the instructions to select the digital content payoff comprise instructions to:
   select, from among a plurality of different predetermined machine-readable links associated with different digital content payoffs, the machine-readable link associated with the digital content payoff associated with printing on the printing device with the identified type of mobile device.

4. The storage medium of claim 1, wherein the instructions to select comprise instructions to:
   select, from among a plurality of different digital content payoffs each associated with printing on the printing device with different type of mobile device, the digital content payoff associated with printing on the printing device with the identified type of mobile device; and
   generate the machine readable link associated with the selected digital content payoff.

5. The storage medium of claim 1, wherein instructions to select comprise instructions to:
   select, from among a plurality of different digital content payoffs each associated with printing on the printing device with a different type of mobile device, the digital content payoff associated with printing on the printing device with the identified type of mobile device; and
   acquire a machine-readable link associated with the selected digital content payoff from a remote linking service.

6. The storage me of claim 1, wherein the selected digital content payoff is a remote network resource providing access to a computer application executable with the identified type of mobile device and useable by the identified type of mobile device to print to the printing device.

7. The storage medium claim 1, wherein the instructions to generate comprise instructions to:
   add, to a test page template, the machine-readable link associated with the selected digital content payoff to generate the customized test page.

8. A system comprising a processor executing:
   an acquire engine that, during a printing device installation process for a printing device, acquires identification of a type of a mobile device associated with a user;
   a selection engine that, in response to identification of a first type of mobile device, selects a first digital content payoff associated with printing on the target printing device with the first type of mobile device;
   the selection engine further, in response to identification of a second type of mobile device, selects a second digital content payoff associated with printing on the target printing device with the second type of mobile device;
   a generate engine that generates a customized printing device installer test page including a machine-readable link associated with the selected digital content payoff, the machine-readable link causing the mobile device to access the selected digital content payoff in response to the mobile device capturing an image of the machine-readable link; and
   a print engine that causes the printing device to print the customized printing device installer test page.

9. The system of claim 8, wherein:
   the first digital content payoff is a remote network resource providing access to a first computer application executable with the first type of mobile device and useable by the first type of mobile device to print to the printing device; and
   the first computer application is not useable by the second type of mobile device to print to the printing device.

10. The system of claim 8, wherein:
    the acquire engine further displays a graphical user interface (GUI) on a display of the computing device; and the acquire engine further receives the identification of the selected type of the mobile device as input to the GUI via at least one input device of the computing device.

11. The system of claim 8, wherein:

the acquire engine further displays, in the GUI, a plurality of mobile device type options for selection and a generic option, wherein the generic option does not identify any particular type of mobile device.

12. The system of claim 11, wherein:

in response to selection of the generic option, the selection engine selects a generic digital content payoff; and the generic digital content payoff is a remote network resource of information relating to printing on the printing device with each of multiple different types of mobile devices.

13. A method comprising:

with a printing device installer for a printing device executing on a computing device, acquiring identification of a type of a mobile device associated with a user;

based on the identified mobile device type, selecting, from among a plurality of digital content payoffs associated with respective types of mobile devices, a digital content payoff associated with printing on the printing device with the identified type of mobile device;

with the printing device installer, adding, to a test page template, a machine-readable link associated with the selected digital content payoff to generate a customized test page, the machine-readable link causing the mobile device to access the selected digital content payoff in response to the mobile device capturing an image of the machine-readable link; and causing the printing device to print the customized test page.

14. The method of claim 13, further comprising:

providing the selected digital content payoff to a remote linking service; and acquiring a machine-readable link associated with the selected digital content payoff from the remote linking service.

15. The method of claim 13, further comprising:

with the printing device installer, installing a print driver for the printing device on the computing device;

wherein the causing the printing device to print comprises causing the printing device to print the customized test page via the installed print driver.

* * * * *

UNITED STATES PATENT AND TRADEMARK OFFICE
CERTIFICATE OF CORRECTION

PATENT NO. : 10,164,925 B2
APPLICATION NO. : 15/519628
DATED : December 25, 2018
INVENTOR(S) : Anil Datta Kumar Balasubramanya It is certified that error appears in the above-identified patent and that said Letters Patent is hereby corrected as shown below:

In the Claims

In Column 14, Line 8, Claim 4, after "with" insert -- a --.

In Column 14, Line 14 approx., Claim 5, after "wherein" insert -- the --.

In Column 14, Line 24, Claim 6, delete "me" and insert -- medium --, therefor.

In Column 14, Line 29 approx., Claim 7, after "medium" insert -- of --.

Signed and Sealed this
Nineteenth Day of November, 2019

Andrei Iancu
*Director of the United States Patent and Trademark Office*